United States Patent
Iwase

(10) Patent No.: US 7,525,771 B2
(45) Date of Patent: Apr. 28, 2009

(54) GMR SPIN-VALVE ELEMENT EVALUATION METHOD, MAGNETIC HEAD MANUFACTURING METHOD, AND MAGNETIC STORAGE DEVICE

(75) Inventor: Takeshi Iwase, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 702 days.

(21) Appl. No.: 11/206,215

(22) Filed: Aug. 18, 2005

(65) Prior Publication Data
US 2006/0221508 A1   Oct. 5, 2006

(30) Foreign Application Priority Data
Mar. 31, 2005   (JP) ............................. 2005-105230

(51) Int. Cl.
*G11B 5/127* (2006.01)
(52) U.S. Cl. ................................... 360/324.1
(58) Field of Classification Search ............. 360/324.1, 360/324.12, 313, 324.3, 324.11, 324.2; 29/603.14
See application file for complete search history.

(56) References Cited

U.S. PATENT DOCUMENTS

| 6,124,711 | A  | * | 9/2000  | Tanaka et al. | ................ | 324/252    |
| 6,221,172 | B1 | * | 4/2001  | Saito et al.  | ................ | 148/108    |
| 6,392,849 | B2 | * | 5/2002  | Maruyama et al. | .......... | 360/314    |
| 6,452,763 | B1 | * | 9/2002  | Gill          | ................ | 360/324.11 |
| 6,469,873 | B1 | * | 10/2002 | Maruyama et al. | .......... | 360/314    |
| 6,580,589 | B1 | * | 6/2003  | Gill          | ................ | 360/324.11 |
| 6,628,483 | B1 | * | 9/2003  | Saito et al.  | ................ | 360/314    |
| 6,693,775 | B1 | * | 2/2004  | Gill          | ................ | 360/324.11 |
| 6,700,757 | B2 | * | 3/2004  | Pinarbasi     | ............... | 360/324.12 |
| 6,907,655 | B2 | * | 6/2005  | Pinarbasi     | ................ | 29/603.14  |
| 7,164,560 | B2 | * | 1/2007  | Saito et al.  | ............. | 360/324.11 |
| 7,280,326 | B2 | * | 10/2007 | Gill          | ................ | 360/324.12 |
| 2001/0043447 | A1 | * | 11/2001 | Saito et al. | ............. | 360/324.11 |
| 2004/0034991 | A1 | * | 2/2004  | Pinarbasi    | ................ | 29/603.01  |
| 2004/0141259 | A1 | * | 7/2004  | Saito et al. | ............. | 360/324.11 |

FOREIGN PATENT DOCUMENTS

JP        2000-99932        4/2000

* cited by examiner

*Primary Examiner*—Allen T Cao
(74) *Attorney, Agent, or Firm*—Fujitsu Patent Center

(57) ABSTRACT

A method for evaluating a magnetized state of a pinned layer of a magnetoresistive spin-valve element used, together with a recording element, in a magnetic head, is provided. The method includes the steps of (a) supplying a first alternating current to the recording element, while supplying a second current for generating a magnetic field to the spin-valve element, the direction of the magnetic field generated by the second current being opposite to a prescribed direction of magnetization of the pinned layer adjacent to an antiferromagnetic layer; and (b) determining whether the magnetization of the pinned layer is inverted toward said direction opposite to the prescribed direction.

11 Claims, 10 Drawing Sheets

FIG.6
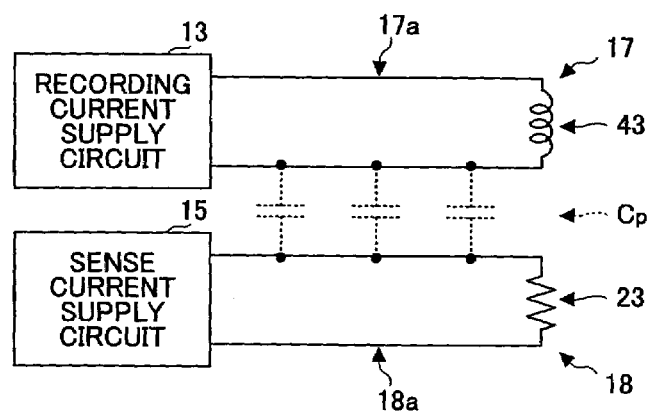
FIG.7A  DCT CURRENT
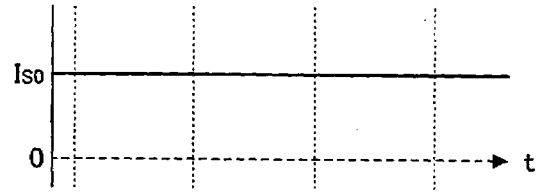
FIG.7B  ACT CURRENT
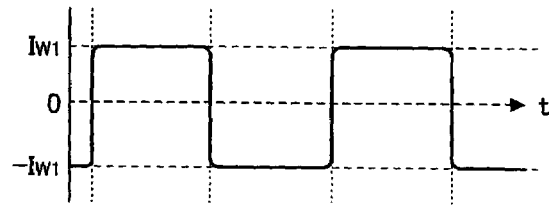
FIG.7C  MAGNETIZATION INVERTING CURRENT
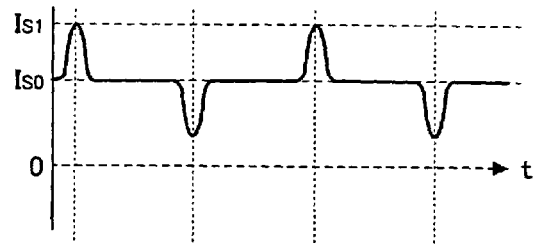

FIG.9A DCT CURRENT 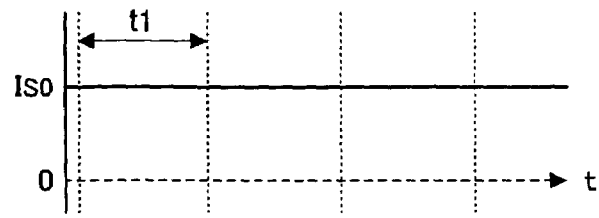
FIG.9B ACT CURRENT 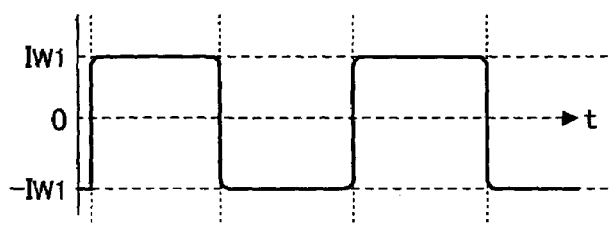
FIG.9C PULSE CURRENT 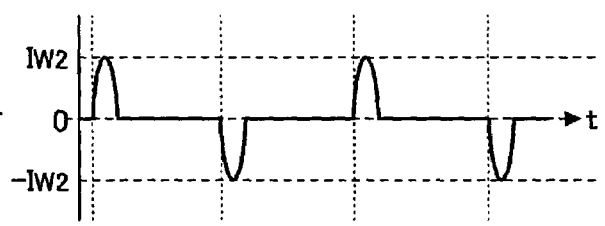
FIG.9D ACPT CURRENT 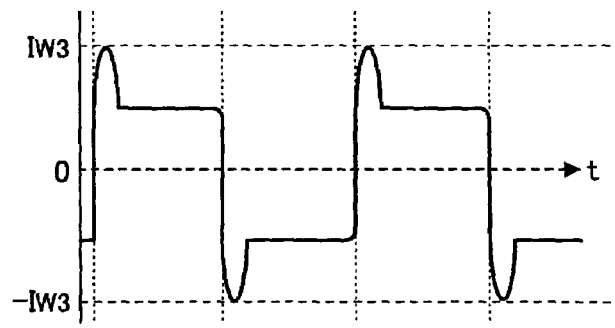
FIG.9E MAGNETIZATION INVERTING CURRENT 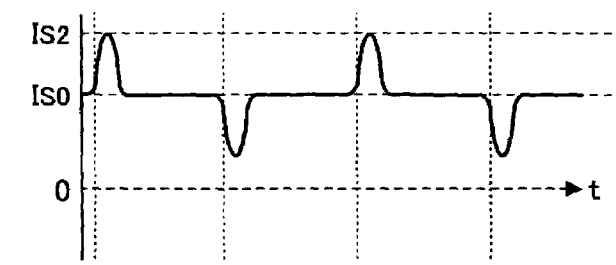

GMR SPIN-VALVE ELEMENT EVALUATION METHOD, MAGNETIC HEAD MANUFACTURING METHOD, AND MAGNETIC STORAGE DEVICE

BACKGROUND OF THE INVENTION

1. Field of the Invention

The present invention relates to a method for evaluating the magnetized state of a pinned layer of a giant magnetoresistive (GMR) spin-valve element, a method for manufacturing a magnetic head with a GMR spin-valve element, and a magnetic storage device.

2. Description of the Related Art

Along with the increase of recording density of magnetic storage devices, use of a so-called spin-valve element or GMR element has been spreading, which element is used as a reproducing element to reproduce information from a magnetic recording medium. As illustrated in FIG. 1, a spin valve element 100 includes a spin-valve (SV) film 110 consisting of an antiferromagnetic layer 112, a pinned layer (fixed magnetized layer) 113, a nonmagnetic interlayer 114, and a free layer (or magnetic free layer) 115. The direction of magnetization of the pinned layer 113 is fixed in the Z2 direction by mutual interaction with the antiferromagnetic layer 112. The magnetization of the free layer 115 points in the Y1 direction, which is perpendicular to the magnetization $M_{PIN}$ of the pinned layer 113 when no magnetic field $H_{sig}$ is applied from the magnetic recording medium 117. In the GMR spin-valve element 100, sense current $I_s$ is supplied to the SV film 110 in the Y1 direction, which direction is parallel to the surface of the magnetic recording medium 117, and a change in electric resistance caused by change of the angle between the magnetization $M_{FR}$ of the free layer 115 and the magnetization $M_{PIN}$ of the pinned layer 113 is detected as a voltage change. When the magnetic field $H_{sig}$ generated from the magnetic recording medium 117 is applied in the Z1 direction or Z2 direction so as to affect the magnetization $M_{FR}$ of the free layer 115, the magnetization $M_{FR}$ changes. In other words, the GMR spin-valve element 100 reproduces the information from the magnetic recording medium 117 using a certain level of sense current $I_s$ flowing through the SV film 110 to monitor a voltage change corresponding to the change in electric resistance.

The magnetization $M_{PIN}$ of the pinned layer 113 is fixed through the mutual interaction with the antiferromagnetic layer 112; however, if an excessive amount of electric current happens to flow in the SV film 110 due to, for example, electrostatic discharge, the magnetization $M_{PIN}$ may be inverted. If the magnetization MPIN is inverted, the polarity of the reproduced output signal is reversed with respect to the magnetic field from the magnetic recording medium 117. This phenomenon is illustrated in FIG. 2A and FIG. 2B. If the magnetization of $M_{PIN}$ of the pinned layer 113 is inverted, the polarity of the reproduced waveform is inverted, as illustrated in FIG. 2B, with respect to that of the normal SV film of a GMR element shown in FIG. 2A. If this happens, a read error will occur. In addition, if the magnetization $M_{PIN}$ of the pinned layer 113 deviates from a correct direction, the symmetry of the positive and negative wave heights of the reproduced signal is degraded, and read error increases.

A conventionally proposed evaluation method is to vary the level of the sense current and to measure a level at which the magnetization of the pinned layer 113 is inverted. The measurement result is used as one of performance evaluation factors of the GMR element 100. With the conventional method, the sense current $I_s$ is supplied in a direction opposite to the ordinary current flow, so as to apply the magnetic field produced by the sense current in the Z1 direction, which direction is opposite to the magnetization $M_{PIN}$ of the pinned layer 113. As the sense current $I_s$ increases, the intensity of the magnetic field increases, and the magnetization of the pinned layer 113 cannot resist this magnetic field any longer. Finally, the magnetization of the pinned layer 113 inverts to the direction of the magnetic field of the sense current. The performance of the GMR element is evaluated based on the level of the sense current that causes the magnetization to invert. See, for example, JP 2000-99932A.

By the way, as the recording density increases, a so-called read gap length is narrowed. The read gap length is the distance between the two shields 118a and 118b shown in FIG. 1. In order to narrow the read gap length, the total thickness of the SV film 110 has to be reduced. To this end, the cross-sectional area of the current path of the sense current is decreased. If measurement of inversion of the magnetization of the pinned layer 113 is performed on the SV film 110 with the reduced thickness, the temperature rises due to heat, and the SV film 110 may be broken down. This is because the cross-sectional area of the SV film 110 is reduced, and because the electric current density of the sense current becomes excessive before it reaches the magnetization inversion level. Even though the SV film 110 is not broken down, the antiferromagnetic layer 113 may become paramagnetic, surpassing the Neel point due to the high temperature. Once the antiferromagnetic layer 113 becomes paramagnetic, it cannot pin the magnetization of the pinned layer 113 any longer even after it is cooled down. This prevents accurate detection of the magnetic field produced by the magnetic recording medium 117.

SUMMARY OF THE INVENTION

The present invention is conceived in view of the above-described problems in the prior art, and it is an object of the invention to provide a method for evaluating the magnetized state of a GMR spin-valve element without damaging the GMR spin-valve element.

It is another object of the invention to provide a method for manufacturing a magnetic head.

It is still another object of the invention to provide a highly reliable magnetic storage device.

In one aspect of the invention, a method for evaluating the magnetized state of the pinned layer of a GMR spin-valve element used, together with a recording element, in a magnetic head is provided. The method includes the steps of (a) supplying a first alternating current to the recording element, while supplying a second current for generating a magnetic field to the spin-valve element, the direction of the magnetic field generated by the second current being opposite to a prescribed direction of magnetization of the pinned layer adjacent to an antiferromagnetic layer; and (b) determining whether the magnetization of the pinned layer is inverted toward said direction opposite to the prescribed direction.

With this method, the current flowing in the spin-valve element is an alternating current defined by a combination of the second current and an induced alternating component caused by the first current. The magnetic field generated at the peak of the alternating current is applied so as to be opposite to the magnetization of the pinned layer. The stability of the magnetized state of the pinned layer is evaluated by determining whether the magnetization of the pinned layer has been inverted from the previous direction under the supply of the first and second currents. Because the current flowing in the spin-valve element is alternating current, the average current flowing in the spin-valve element per unit time is reduced, as compared with a conventional method using solely a direct sense current. Heat generation is prevented in the spin-valve element, and therefore, the magnetized state of the pinned layer can be evaluated without damaging the element.

In another aspect of the invention, a method for manufacturing a magnetic head having a recording element and a magnetoresistive spin-valve element is provided. The manufacturing method comprises the step of testing a magnetized state of a pinned layer of the spin-valve element, wherein the testing step includes:

(a) supplying a first alternating current to the recording element, while supplying a second current for generating a magnetic field to the spin-valve element, the direction of the magnetic field generated by the second current being opposite to a prescribed direction of magnetization of the pinned layer adjacent to an antiferromagnetic layer; and (b) determining whether the magnetization of the pinned layer is inverted toward said direction opposite to the prescribed direction.

In still another aspect of the invention, a magnetic storage apparatus is provided. The apparatus comprises:

(a) a magnetic recording medium;
(b) a magnetic head having a recording element and a magnetoresistive spin-valve element;
(c) a recording/reproduction controller configured to record and reproduce information in and from the magnetic recording medium using the magnetic head;
(d) a determination unit configured to determine a direction of magnetization of a pinned layer of the spin-valve element when a reproduction error has occurred, the pinned layer being adjacent to an antiferromagnetic layer; and
(e) a magnetization recovery unit configured to supply a first alternating current to the recording element, while supplying a third current for generating a magnetic field in a prescribed direction of magnetization of the pinned layer to the spin-valve element, to restore the direction of the magnetization of the pinned layer to the prescribed direction when the magnetization of the pinned layer is inverted with respect to the prescribed direction.

With this magnetic storage apparatus, when a reproduction error occurs due to inversion of magnetization of the pinned layer of the spin-valve element of the magnetic head, the magnetization of the pinned layer can be restored to the normal direction without damaging the spin-valve element, and further reproduction error can be prevented.

Thus, a reliable magnetic storage apparatus is realized.

BRIEF DESCRIPTION OF THE DRAWINGS

Other objects, features, and advantages of the present invention will become more apparent from the following detailed description when read in conjunction with the accompanying drawings, in which:

FIG. 6 is a circuit diagram equivalent to the recording head and the SV element;

FIG. 7A through FIG. 7C are current waveforms of the recording element/SV element circuit;

FIG. 9A through FIG. 9E are current waveforms of the recording element/SV element circuit;

DETAILED DESCRIPTION OF THE PREFERRED EMBODIMENTS

The preferred embodiments of the present invention are described below with reference to the attached drawings. In this specification, a recording operation may be referred to as a "writing" operation, reproduction may be referred to as "read", and a reproduction error may be referred to as a "read error".

First Embodiment

Explanation is made of a method and an apparatus for evaluating a GMR spin-valve element according to the first embodiment.

Figure 3:
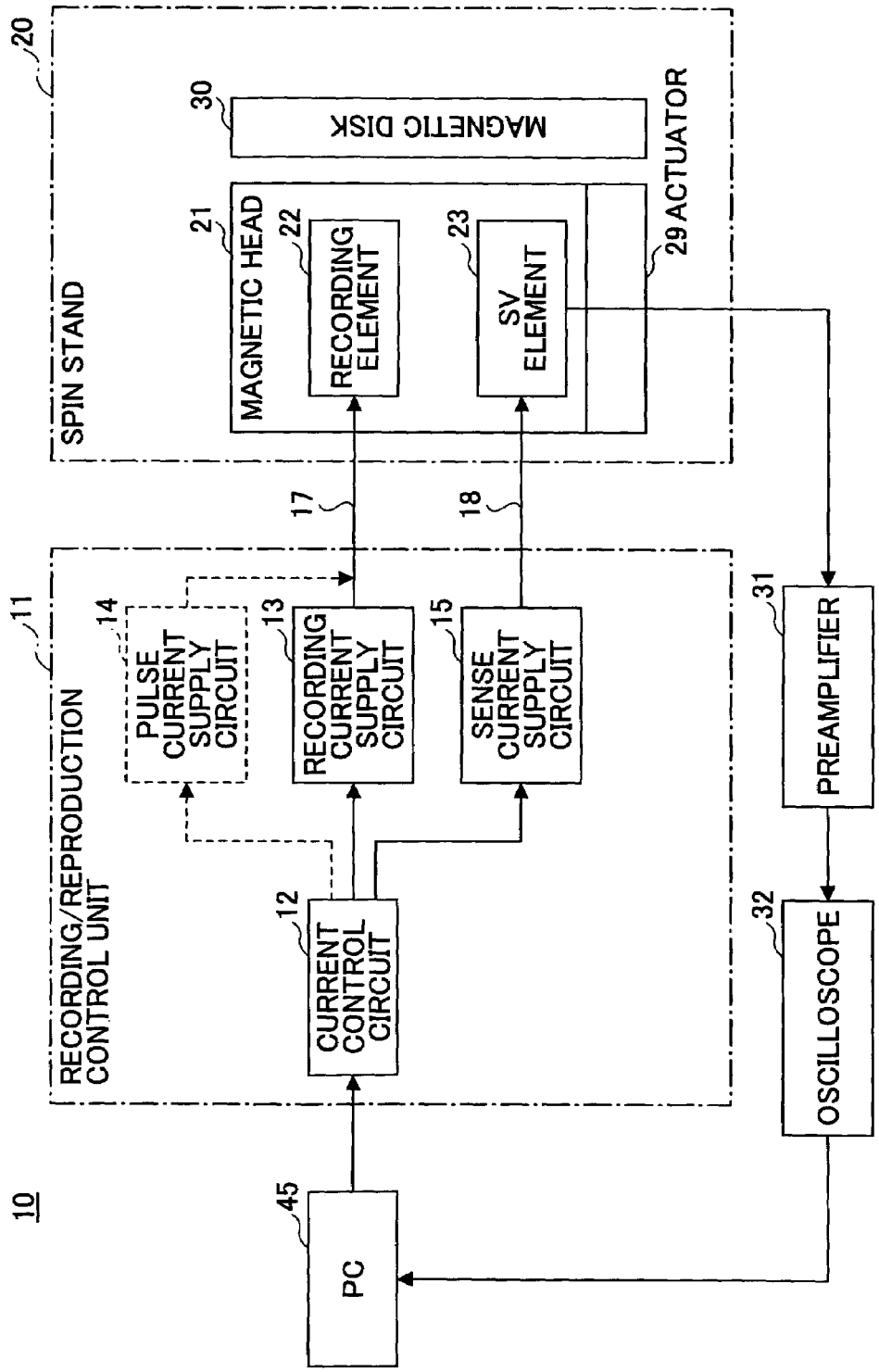
FIG. 3 is a block diagram of a GMR spin-valve element evaluation apparatus according to the first embodiment of the invention.

FIG. 3 is a block diagram of a GMR spin-valve element evaluation apparatus according to the first embodiment of the invention. In the following embodiments, the GMR spin-valve element is referred to as a "SV element", and the GMR spin-valve element evaluation apparatus is referred to as a "SV element evaluation apparatus".

In FIG. 3, the SV element evaluation apparatus includes a recording/reproduction control unit 11, a spin stand 20, a preamplifier 31, an oscilloscope 32, and a personal computer (PC) 45. In the spin stand 20 are a magnetic head 21 having a recording element 22 and an SV element 23 to be evaluated, together with a magnetic disk 30 in and from which information is written and reproduced by the magnetic head 21. The SV element evaluation apparatus 10 is configured to evaluate the stability of magnetization of the pinned layer of the SV element 23.

The recording/reproduction control unit 11 has an electric current control circuit 12, a recording current supply circuit 13, and a sense current supply circuit 15. The recording/reproduction control unit 11 operates under the control of the PC 45 so that the electric current control circuit 12 outputs signals to the recording current supply circuit 13 and the sense current supply circuit 15 in order to control the waveforms, the levels, and the timings of electric current to be supplied to the recording element 22 and the SV element 23, respectively, when detecting the magnetization of the pinned layer of the SV element and when inverting the magnetization of the pinned layer, as is described below. Upon receiving these signals, the recording current supply circuit 13 and the sense current supply circuit 15 supply electric current to the recording element 22 and the SV element 23, respectively, to perform the associated operations.

The spin stand 20 is provided with an actuator 29 for holding and moving the magnetic head 21 so as to be floating over the magnetic disk 30. The spin stand 20 keeps the magnetic head 21 in the floating state similar to that in the magnetic disk apparatus for allowing recording and reproducing operations. The magnetic disk 30 has a recording layer made of a metal thin film, such as a Co—Cr—Pt alloy film, formed over a disk substrate. The magnetic disk 30 holds information by allowing the recording layer to be magnetized in a direction parallel or perpendicular to the surface of the magnetic disk 30 according to the magnetic field from the magnetic head for writing information.

The preamplifier 31 amplifies the reproduced signal output from the SV element 23. The preamplifier for amplifying the output (reproduced signal) from the SV element 23 may be provided in the spin stand 20.

The oscilloscope 32 displays the waveform of the reproduced signal amplified by the preamplifier 31 on its monitor screen so as to allow determination whether the magnetization of the pinned layer has been inverted. An analog-to-digital converter may be used in place of the oscilloscope 32 to acquire a digital output, which output is then processed by the PC 45 for the determination of inversion of magnetization of the pinned layer, instead of displaying the digital output of the reproduced signal on the oscilloscope 32.

In PC 45, a program for controlling the recording/reproduction control unit 11, the spin stand 20, the preamplifier 31, and the oscilloscope 32 is written in the memory or a magnetic storage device (not shown). The SV element evaluation apparatus 10 executes the evaluation method, which is described below, based on the program.

Figure 4:
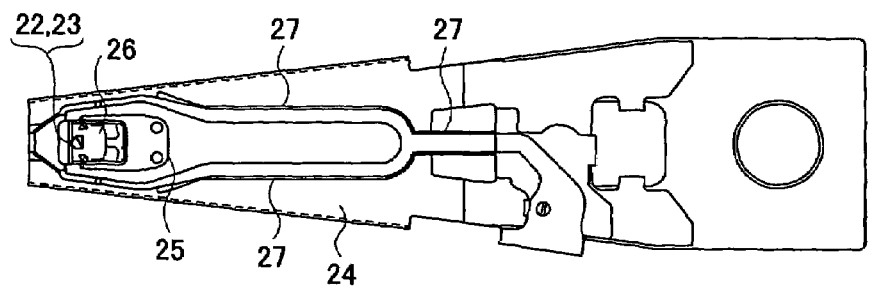
FIG. 4 is a bottom view of the magnetic head facing a recording medium.

FIG. 4 is a bottom view of the magnetic head, which is the view facing the magnetic recording medium. The magnetic head 21 includes a suspension 24, a head slider 26 fixed to a gimbal 25 at the end of the head slider 26, a recording element 22 and an SV element 23 provided on the head slider 26, and a flexible wiring 27 connected to the recording element 22 and the SV element 23. A part of the flexible wiring 27 is paired wirings extending in parallel and coupled to the recording element 22 and the SV element 23, respectively. During the inversion of magnetization of the pinned layer (the details of which are described below), an alternating current supplied via one of the wirings to the recording element 22 causes further alternating current in the other wiring connected to the SV element 23. The invention makes use of this phenomenon to invert the magnetization of the pinned layer without damaging the SV element 23.

Figure 5:
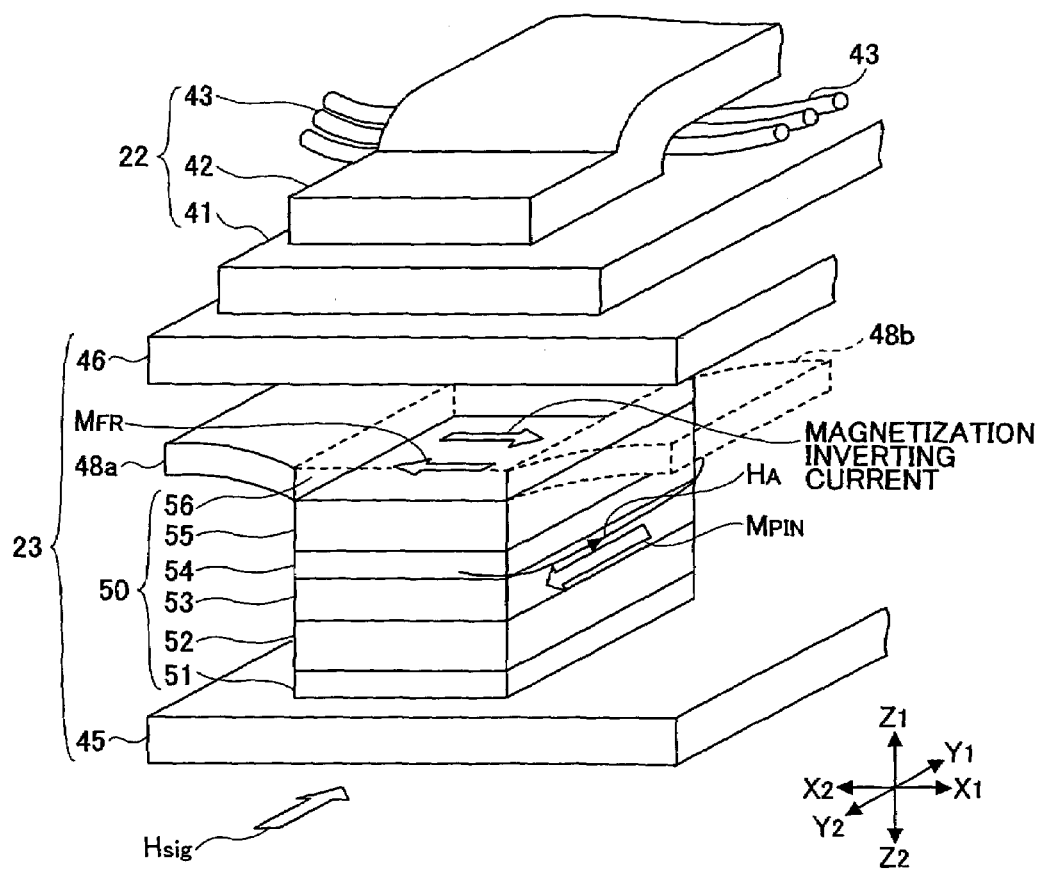
FIG. 5 is a plan view illustrating the recording element and the SV element of the magnetic head.

FIG. 5 is a perspective view of the recording element and the SV element of the magnetic head. It should be noted that orientation control films arranged on both sides (in the X1 and X2 directions) of the SV element are not depicted for the purpose of simplification.

In FIG. 5, the recording element 22 and the SV element 23 are arranged in the recording/reproducing direction (in agreement with the rotating direction of the magnetic disk) at the bottom of the magnetic head so as to face the magnetic recording medium. The recording element 22 has a recording coil 43 between the bottom magnetic pole 41 and the top magnetic pole 42. The recording coil 43 is wound around a yoke (not shown) that magnetically connects the top and bottom magnetic poles 42 and 41. By supplying a recording current to the recording coil 43, a magnetic field (for writing information) is applied to the magnetic disk from the bottom and top magnetic poles 41 and 42 facing the magnetic disk.

The SV element 23 has an SV film 50 between the bottom shield 45 and the top shield 46. The SV film 50 includes an underlayer (e.g., Ta layer) 51, an antiferromagnetic layer (e.g., PdPtMn layer) 52, a pinned layer (e.g., CoFe layer) 53, a nonmagnetic interlayer (e.g., Cu layer) 54, a free layer (e.g., a CoFe/NiFe layered structure) 55, and a protection layer (e.g., Ta layer) 56 that are deposed in this order. The magnetization $M_{PIN}$ of the pinned layer 53 is fixed by the antiferromagnetic layer 52, for example, in the Y2 direction. The magnetization $M_{FR}$ of the free layer 55 is at substantially 90 degrees with respect to the magnetization $M_{PIN}$ of the pinned layer 53 when no magnetic field is applied from the magnetic disk. Upon application of the magnetic field $H_{sig}$ from the magnetic disk, the magnetization $M_{FR}$ of the free layer 55 swings in the Y1 and Y2 directions. Depending on the angle between the magnetization $M_{FR}$ of the free layer 55 and the magnetization $M_{PIN}$ of the pinned layer 53, the electric resistance of the SV film in the width direction (X1 and X2 directions) varies. The sides of the protection layer 56 are furnished with terminals 48a and 48b, respectively. A sense current is supplied to the SV element 23 from one terminal 48b, via the SV film 50, to the other terminal 48a, and a potential difference between the ends of the SV film 50 in the width direction is detected to reproduce information recorded on magnetic disk. In general, the sense current flows in a direction consistent with the magnetization $M_{PIN}$ of the pinned layer 53 in an ordinary read operation.

FIG. 6 is a circuit diagram equivalent to the recording element and the SV element, which circuit includes a recording element circuit 17, and a SV element circuit 18 having an SV element electrically connected to the sense current supply circuit 15.

The recording element circuit 17 includes a recording current supply circuit 13, a wiring 17a, and a recording coil 43 for producing a recording magnetic field. The recording current supply circuit 13 supplies two types of electric currents to the recording coil 43 via the wiring 17a. One type is a recording current for recording signals in the magnetic recording medium when detecting the magnetization of the pinned layer of the SV element 23. The recording current causes, via the recording coil 43, the top and bottom magnetic poles (FIG. 5) to apply a recording magnetic field to the magnetic recording medium. The other type is an alternating current (which is referred to as an "ACT current") for causing an alternate current in the SV element when inverting the magnetization of the pinned layer. The ACT current has an alternating rectangular waveform, which waveform is similar to that of the recording current.

The SV element circuit 18 includes a sense current supply circuit 15, a wiring 18a, and an SV element 23. The sense current supplies circuit 15 supplies two types of currents to the SV element 23 via the wiring 18a. One type is a sense current for reproducing information recorded on the magnetic recording medium when detecting the magnetization of the pinned layer. The sense current is a direct current set at a prescribed level. The other type is a direct current (referred to as a "DCT current") for producing a magnetic field in the SV element 23 in a direction opposite to the magnetization of the pinned layer.

The flexible printed wiring 27 shown in FIG. 4 includes pairs of wirings connected to the recording element 22 and the SV element 23, respectively, arranged close to each other. Accordingly, the recording element circuit 17 and the SV element circuit 18 are expressed in an equivalent circuit in which the wirings 17a and 18a are capacitively coupled by a capacitor Cp, as illustrated in FIG. 6. When ACT current is supplied from the recording current supply circuit 13 to the wiring 17a, an alternating current induced by the ACT current flows in the wiring 18a, which alternate current is supplied to the SV element 23. This phenomenon is explained with reference to FIG. 7A through FIG. 7C, together with FIG. 6.

FIG. 7A through FIG. 7C illustrate waveforms of current flowing in the recording element and the SV element. When inverting the magnetization of the pinned layer, DCT current is supplied from the sense current supply circuit 15 to the SV element circuit 18, as illustrated in FIG. 7A. The current level of the DCT current is set to $I_{SO}$, and the direction of the DCT current is selected such that the magnetization induced by the DCT current is opposite to the magnetization of the pinned layer adjacent to the antiferromagnetic layer. For example, in FIG. 5, DCT current (not shown) is supplied to the SV element 50 from one terminal 48*a* to the other terminal 48*a* (in the X1 direction). Then, the DCT current flows through the non-magnetic interlayer 54 and the free layer 55. The magnetic field $H_A$ is induced around the current path (or the axis) of the DCT current. The direction of the magnetic field $H_A$ is opposite to the direction of magnetization $M_{PIN}$ of the pinned layer 53.

When detecting the magnetization of the pinned layer, sense current flows in the SV element 50 in the X2 direction. The direction of the magnetic field induced by the sense current is the same as that of the magnetization $M_{PIN}$ of the pinned layer 53.

In the recording element circuit 17, ACT current alternating with a rectangular waveform is supplied from the recording current supply circuit 13, as illustrated in FIG. 7B. The ACT current alternates between positive $I_{W1}$ and negative $I_{W1}$.

As illustrated in FIG. 7C, a superposed current in which ACT-induced current is superposed on the DCT current (which current is referred to as a "magnetization inverting current") flows in the SV element 50. In other words, the difference between the magnetization inverting current and the DCT current (at level $I_{SO}$) is the current induced by the ACT current. The magnetization inverting current has a peak ($I_{S1}$) corresponding to the rising edge of the ACT current. The strength of the magnetic field $H_A$ applied to the pinned layer varies according to the magnetization inverting current, and becomes the maximum at the peak current. Consequently, the maximum of the intensity of the magnetic field increases, as compared with the case using solely the DCT current. By supplying ACT current in the wiring 17*a* of the recording element circuit 17 at the same time when supplying the DCT current to the SV element circuit 18, the magnetization inverting current shown in FIG. 7C can be introduced in the SVC element. By appropriately selecting the DCT current level $I_{SO}$ and the ACT current level $I_{W1}$, the magnetization inverting current at a desired level is supplied to the SV element, producing a magnetic field with intensity strong enough to invert the magnetization of the pinned layer.

As compared with the conventional method for supplying only a direct current to the SV element and increasing the direct current to invert the magnetization of the pinned layer, the average quantity of current supplied to the SV element 23 per unit time can be reduced. Since supplying excessive amount of current to the SV element 23 for a long time can be avoided, the magnetized state of the pinned layer can be evaluated without damaging the SV element 23 due to temperature rise.

Figure 8:
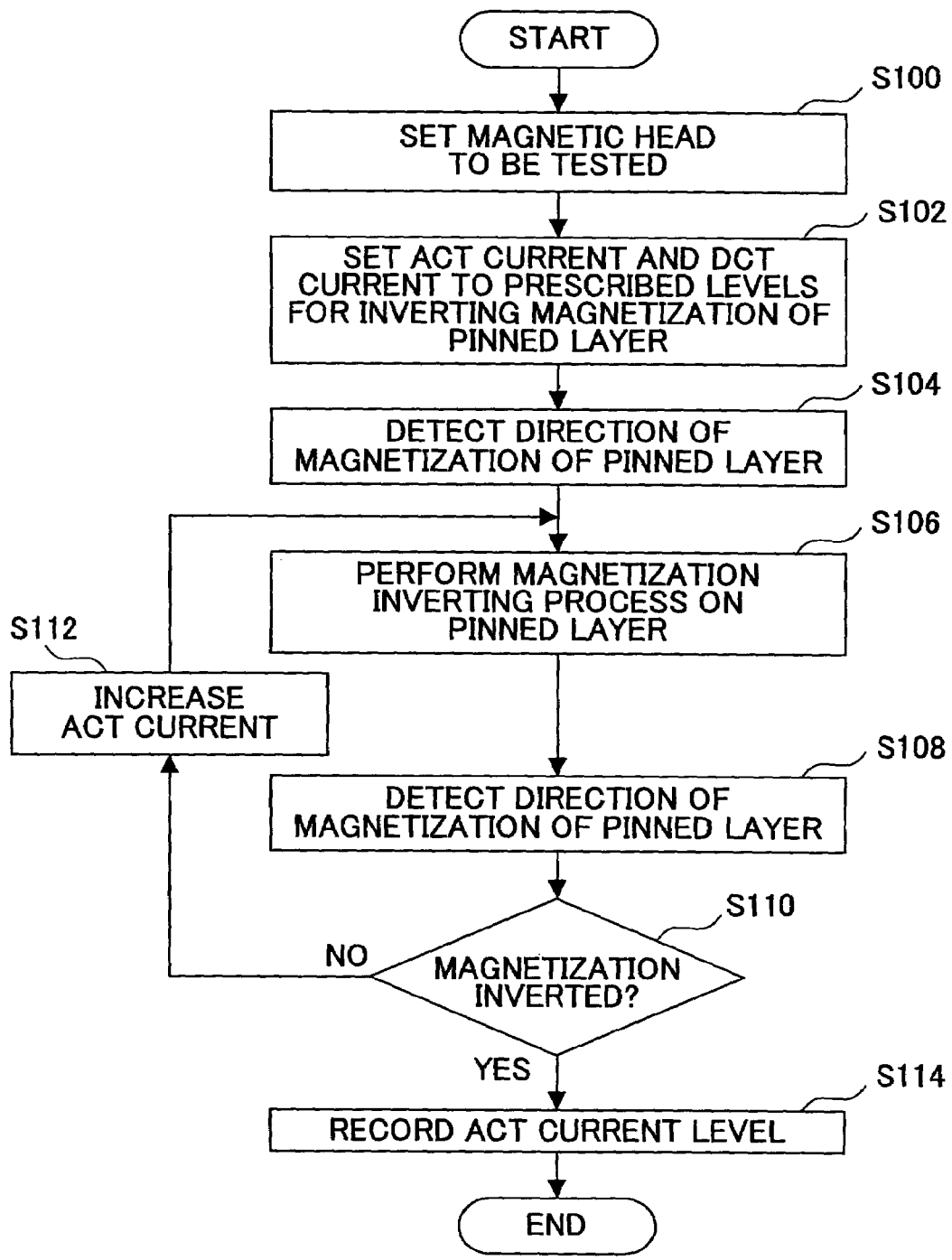
FIG. 8 is a flowchart of the SV element evaluation process according to the first embodiment of the invention.

Next, explanation is made of the SV element evaluation method with reference to FIG. 3 and FIG. 8. FIG. 8 is a flowchart of the SV element evaluation method, in which the ACT current is successively increased to measure a level at which the magnetization of the pinned layer is inverted.

First, the magnetic head 21 to be tested is attached to the actuator 29 of the pin stand 20 shown in FIG. 3 so as to be floating over the magnetic disk 30 (S100). Then, ACT current and DCT current are set to appropriate levels (S102). In this example, the frequency of the ACT current and the current level of the DCT current are set to prescribed levels, and the current level of the ACT current is set to the initial value. The DCT current level is appropriately selected according to the maximum value of the induced current in the SV element circuit caused by the ACT current (which is expressed as subtraction $I_{S1}-I_{SO}$ shown in FIG. 7C).

Figure 1:
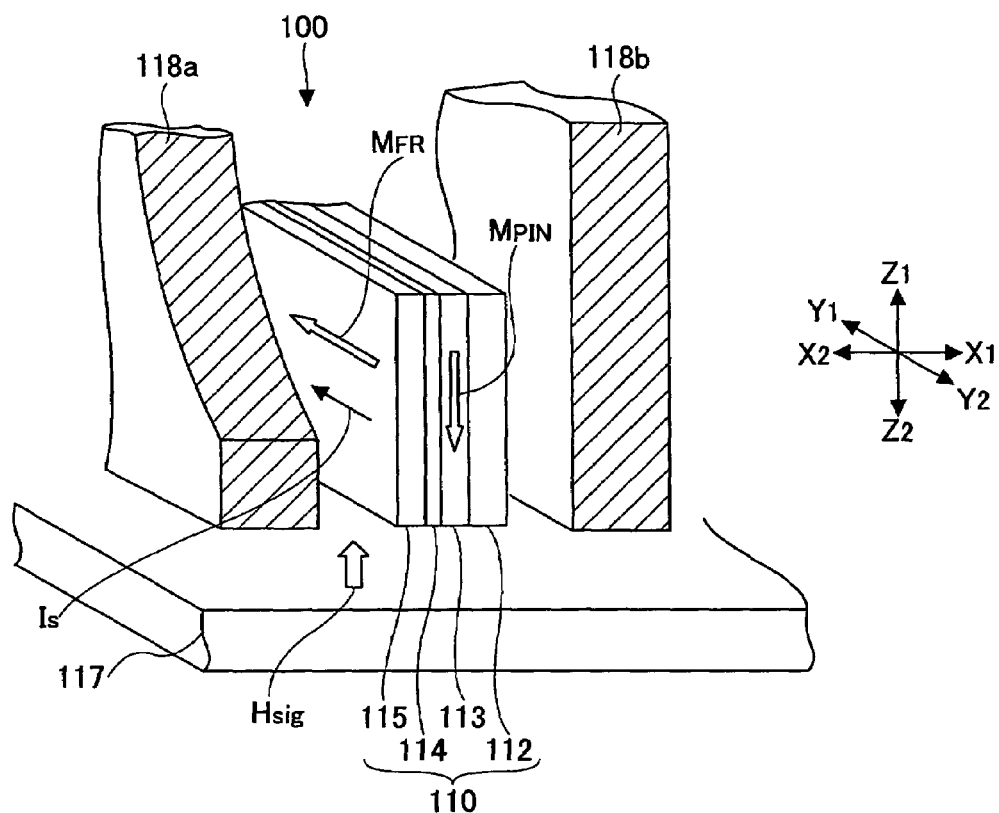
FIG. 1 is a perspective view of a GMR spin-valve element.
Figure 2A:
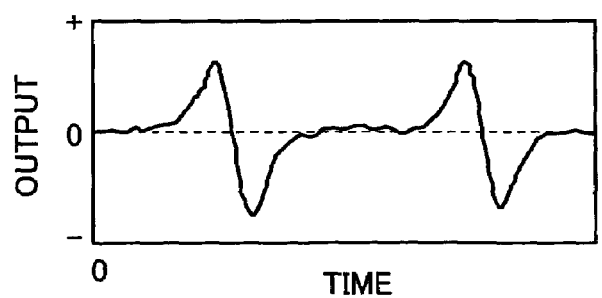
FIG. 2A is a reproduced waveform of a GMR element with a normal SV film.
Figure 2B:
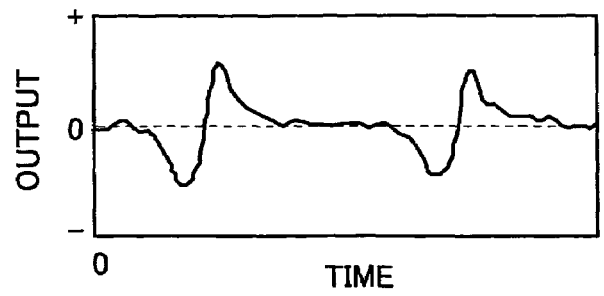
FIG. 2B is a reproduced waveform of a GMR element with the magnetization of the pinned layer inverted.

Then, the direction of magnetization of the pinned layer 53 is detected (S104). To be more precise, an ordinary-level recording current suitable for writing in a magnetic disk is supplied from the recording current supply circuit 13 to the recording element 22 to record a signal (for example, a di-bit signal) in the magnetic disk 30. Then, a sense current is supplied to the SV element 23 to reproduce the signal recorded in the magnetic disk, and the reproduced waveform is measured by the oscilloscope 32. A reproduced waveform shown in FIG. 2A or FIG. 2B is observed on the oscilloscope 32. The observed waveform is recorded, which waveform indicates that the magnetization of the pinned layer 53 points in a specific direction.

Then, the magnetization of the pinned layer 53 is inverted under the supply of electric current (S106). In this step, ACT current and DCT current set in S102 are supplied simultaneously to the recording element 22 and the SV element 23, respectively, for about a second in order to apply a magnetic field opposite to the magnetization of the pinned layer 53 onto the pinned layer 53.

Then, the direction of magnetization of the pinned layer 53 is detected (S108) in a manner similar to S104. Based on the polarity of the acquired waveform, it is determined whether the magnetization of the pinned layer 53 has been inverted (S110). If the magnetization has not been inverted (NO in S110), the ACT current level is increased. Steps S106 through S112 are repeated until the magnetization of the pinned layer 53 is inverted.

If the magnetization of the pinned layer 53 has been inverted (YES in S110), the ACT current level that caused the inversion of the magnetization is recorded (S114), and the process terminates.

The above-described SV element evaluation method may be automatically performed by executing the program installed in the hard disk drive of the personal computer 45. The polarity of the reproduced waveform may also be automatically determined using a comparator.

In the SV element evaluation method, the DCT current supplied from the sense current supply circuit 15 is fixed to a prescribed value, while increasing the ACT current to measure the current level at which the magnetization of the pinned layer 53 is inverted. Since the current flowing in the SV element 23 is an alternating current defined by the combination of the DCT current and an induced alternating current caused by the ACT current, the intensity of the magnetic field that causes the magnetization of the pinned layer 53 to invert can be measured without supplying an excessive amount of electric current to the SV element 23. This arrangement allows measurement of inversion of magnetization without damaging the SV element 23.

Although in the above-described method the magnetization-inverting current level is measured by gradually increasing the ACT current level, a prescribed level of the magnetization inverting current, which is a combination of the DCT current and the ACT current, may be used as a threshold in the SV element 23. In this case, the DCT current and the ACT current are set to such levels that allow the SV element to be evaluated as a good one if the magnetization of the pinned layer 53 is maintained at the superposed current level in S102. Using the ACT current and the DCT current that creates an appropriate threshold level is used for the magnetization inversion process of the pinned layer 53 in S106. If no inversion of magnetization occurs in S110, then the SV element 23 is evaluated as being of a good quality. (If inversion occurs, the SV element 23 is determined as being defective.) This method can omit the step of increasing the ACT current, and allows easy evaluation of the magnetized state of the pinned layer 53. Alternatively, another type of magnetization inverting current shown in FIG. 9, which is described below, may be used in the above-described evaluation method.

Next, explanation is made of a modification of the SV element evaluation method of FIG. 8. In the modification, the ACT current is fixed to a prescribed value, while the DCT current is increased successively, to measure the stability of the magnetization of the pinned layer 53. Because most of the modification is the same as the evaluation method shown in FIG. 8, overlapping explanation is omitted.

Steps S100 through S110 are the same as those in FIG. 8, except that the ACT current is set to, for example, 40 mA in S102. If the magnetization of the pinned layer 53 is not inverted (NO in S110) after the magnetization inverting step S106, then the DCT current level is increased. If the magnetization of the pinned layer 53 is invert (YES in S110), the DCT current level that causes the inversion of the magnetization is recorded in S114.

By supplying a prescribed level of ACT current, while increasing the DCT current, to the SV element 23 during the magnetization inverting process for the pinned layer 53, excessive amount of current flow in the SV element 23 is prevented, and the intensity of the magnetic field that causes inversion of magnetization of the pinned layer 53 can be measured without damaging the SV element 23.

As still another alternative, the waveform and the wave height of the ACT current may be changed, instead of varying the ACT current level or DCT current level.

FIG. 9A through FIG. 9E illustrate waveforms of electric current flowing in the recording element 22 and the SV element 23.

The DCT current and the ACT current shown in FIG. 9A and FIG. 9B, respectively, are the same as those shown in FIG. 7A and FIG. 7B, respectively.

As illustrated in FIG. 9C, a short width pulse is applied to the wiring of the recording element circuit 17 at the rising edge of the ACT current shown in FIG. 9B. In this case, a pulse current supply circuit 14 is provided in the recording/reproduction control unit 11, as illustrated by the dashed block in FIG. 3. To the pulse current supply circuit 14 are supplied signals controlling the time width, the current level, and the timing of the pulse current from the current control circuit 12. The pulse current supply circuit 14 supplies a pulse current having a positive peak $I_{W2}$ and a negative peak $-I_{W2}$ to the recording element circuit 17.

As a result, a composite signal with the waveform shown in FIG. 9D (which is referred to as an "ACPT current") is supplied to the wiring of the recording element circuit 17 shown in FIG. 6. The ACPT current has a peak $I_{W3}$. The pulse width of the pulse current is set shorter than the half period t1 of the ACT current.

Under the application of ACPT current shown in FIG. 9D, a magnetization inverting current with a waveform shown in FIG. 9E flows in the SV element 23. The peak of the magnetization inverting current is derived from superposition of the pulse current on the DCT current. By changing the pulse height of the pulse current, the intensity of the magnetic field to be applied to the magnetization of the pinned layer 53 can be adjusted.

The SV element 23 is evaluated using the DCT current and the ACPT current. The evaluation method is basically similar to that shown in FIG. 8, and therefore, explanation is made in conjunction with FIG. 8.

Steps S100 through S110 apply as they are, except that DCT current, ACT current, and the pulse current are set to prescribed levels in S102. The ACT current is set to, for example, about 40 mA, and the DCT current is set to, for example, 3 mA.

If the magnetization of the pinned layer is not inverted in S110, the peak IW2 of the pulse current is increased in S112. Then, steps S106 through S112 are repeated until the magnetization of the pinned layer 53 is inverted. The level of the pulse current at which the magnetization of the pinned layer 53 is inverted is recorded in S114.

In this manner, when performing the magnetization inversion for the pinned layer 53 by increasing the pulse current, the peak value $I_{W2}$ of the short width pulse current is simply increased, unlike the case for increasing the ACT current. Consequently, the average current flowing in the SV element 23 per unit time can be further reduced. Since it is unnecessary to increase the ACT current shown in FIG. 9B, undesirable heat generation in the recording element 22 can be prevented, unlike the case for increasing the ACT current to invert the magnetization of the pinned layer. Thus, thermal influence on the SV element 23 can be reduced.

By shortening the time width of the pulse current, the maximum value $I_{S2}$ of the magnetization inverting current shown in FIG. 9E flowing in the SV element 23 can be further increased, and therefore, the magnetization of the pinned layer 53 can be easily inverted. The peak $I_{W2}$ of the pulse current and the current level $I_{W1}$ of the ACT current may be increased simultaneously.

According to this embodiment, an alternating ACT current with a rectangular waveform is supplied to the recording element 22, while a DCT current is supplied to the SV element 23 in such a direction that a magnetic field opposite to the magnetization of the pinned layer 53 is applied to the SV element 23, during the magnetization inversion test. Under this condition, a current level of the ACT current or the DCT current at which the magnetization of the pinned layer 53 is inverted is measured to evaluate the magnetized state of the pinned layer. Since the magnetization inverting current flowing in the SV element 23 is an alternating current, the average current per unit time is small. Consequently, thermal damage to the SV element 23 is reduced, and reliable evaluation of the SV element 23 is realized. By using an ACPT current in which a pulse current is superposed on the ACT current, the thermal damage to the SV element 23 can be further reduced, and satisfactory evaluation of the SV element 23 is achieved.

The SV element evaluation method according to this embodiment may be applied to a test operation performed during a magnetic head manufacturing process. Using any one of the above-described three valuation methods, the DCT current, the ACT current, or the pulse current is set as a threshold for the test to determine the acceptability of the product based on observation of the occurrence of inversion of magnetization. If the measured current level that causes the magnetization inversion is at or above the threshold, the magnetic head passes the test. If the measured current level is lower than the threshold, the magnetic head does not pass the test because of insufficient quality. By incorporating this test in the manufacturing process, defective SV elements are prevented from being fed to the subsequent processes or shipped to the market. It is desired to carry out this test process after the assembling of the magnetic head shown in FIG. 4 from the viewpoint of cost. The test may be carried out so that the magnetization inverting step is performed a single time using one of the DCT current, the ACT current, and the pulse current set to a prescribed level. In this case, if the magnetization of the pinned layer is not inverted in spite of application of the magnetic field, the product passes the test. If the magnetization is inverted, the product fails the test.

Second Embodiment

In the second embodiment, a magnetic storage device that can restore the magnetization of the pinned layer 53 from the inverted state caused by the test described in the first embodiment is provided. Examples of the magnetic storage device include a magnetic disk drive, and therefore, the preferred embodiment is described based on this example.

Figure 10:
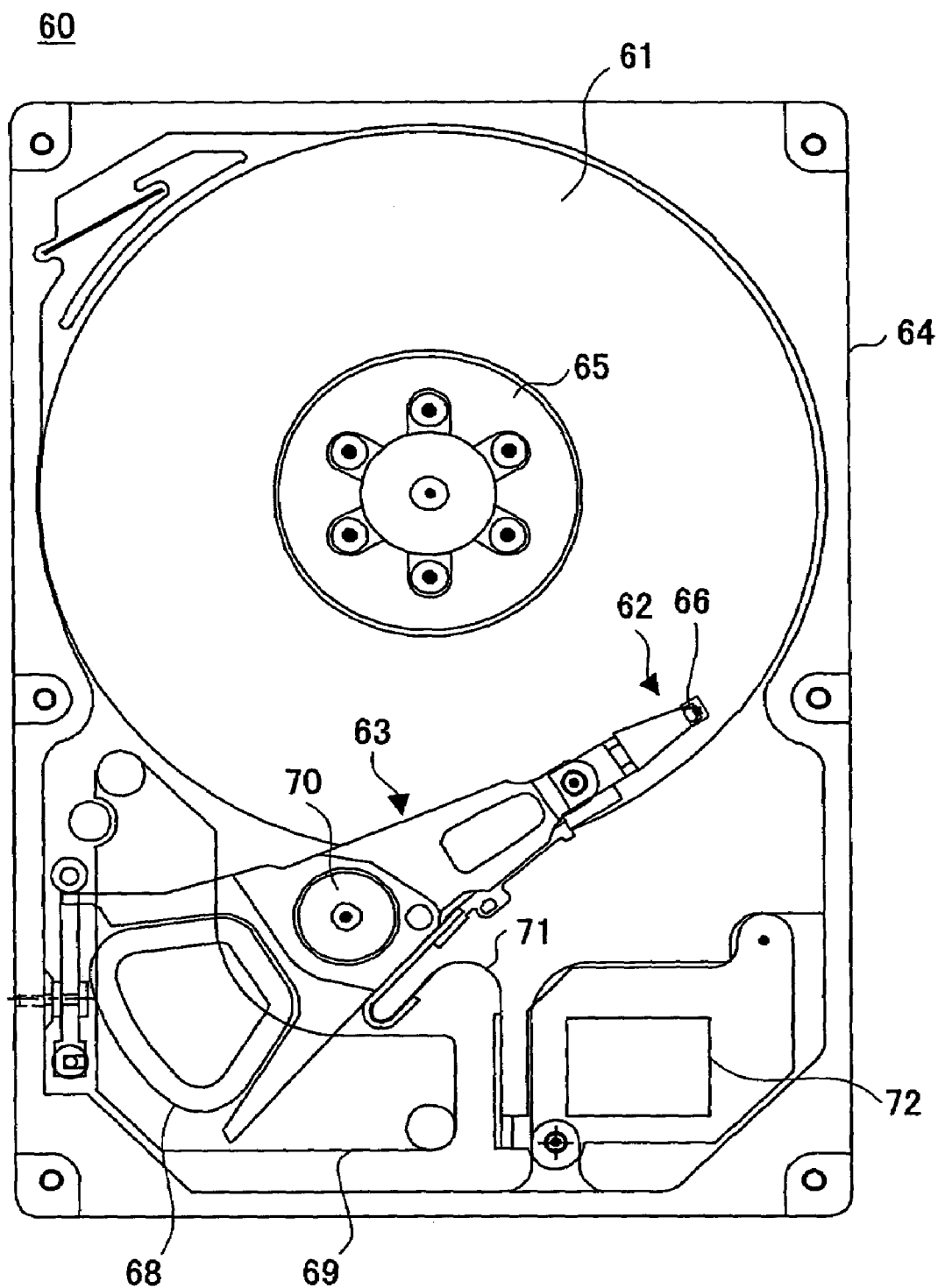
FIG. 10 is a plan view of a magnetic storage device according to the second embodiment of the invention.

FIG. 10 is a plan view of a magnetic storage device according to the second embodiment of the invention. The magnetic storage device 60 includes a magnetic disk 61, a magnetic head 62, an actuator 63, and a disc enclosure 64 for accommodating these components.

Although the detailed structure of the magnetic disk 61 is not depicted here, it has a layered structure in which a magnetic layer for holding information defined by directions of the magnetization, a protection layer for preventing mechanical damage or oxidization of the magnetic layer, a lubricating layer, and other necessary layers are successively deposited over a disk substrate made of, for example, a hardened glass. The magnetic layer may be of an in-plane recording type with its magnetization parallel to the substrate surface, or alternatively, it may be of a perpendicular magnetization type with the orientation perpendicular to the film plane. The magnetic layer is made of a ferromagnetic material, including a CoCrPt alloy, such as CoCrPtB. The magnetic disk 61 is held by a hub 65, and is driven by a spindle motor (SPM) indicated by symbol "67" in FIG. 11. One or more magnetic disks 61 may be held in a vertical direction with gaps between them.

The magnetic disk 61 has a sector ID area and a data area. In the sector ID area are recorded sector information items including a servo signal for allowing the magnetic head 62 to track along the concentric grooves, and a sector ID.

The actuator 63 has a VCM 68 at the root. The VCM 68 is driven by interaction with the magnetic field produced by the permanent magnets 69 placed above and below the VCM 68. The actuator 63 rotates about the rotational axis 70 so as to move the magnetic head 62 in the radial direction of the magnetic disk 61.

The magnetic head 62 is held at the end of the actuator 63 so as to face the magnetic disk 61. On the magnetic head 62 is provided a slider 66 having a recording element 22 and an SV element 23, as illustrated in FIG. 4 and FIG. 5 (although in FIG. 10 they are not illustrated because they are too small). If multiple magnetic disks 61 are accommodated in the disk enclosure 64, multiple magnetic heads 62 may be provided. In this case, each of the recording/reproduction faces of the magnetic disks 61 may be furnished with one of the magnetic heads 62, or alternatively, some magnetic disk face may not be provided with a magnetic head 62.

The magnetic head 62 is electrically connected to the head IC (HDIC) 72 via a flexible printed wiring 71. The HDIC 72 is electrically connected to an electronic board (not shown) provided beneath the disk enclosure 64, on which board are located driver ICs for driving the spindle motor and the VCM 68. The disk enclosure 64 is covered with a top lid, and the entirety is sealed so as to prevent dust from getting in from the external atmosphere.

Figure 11:
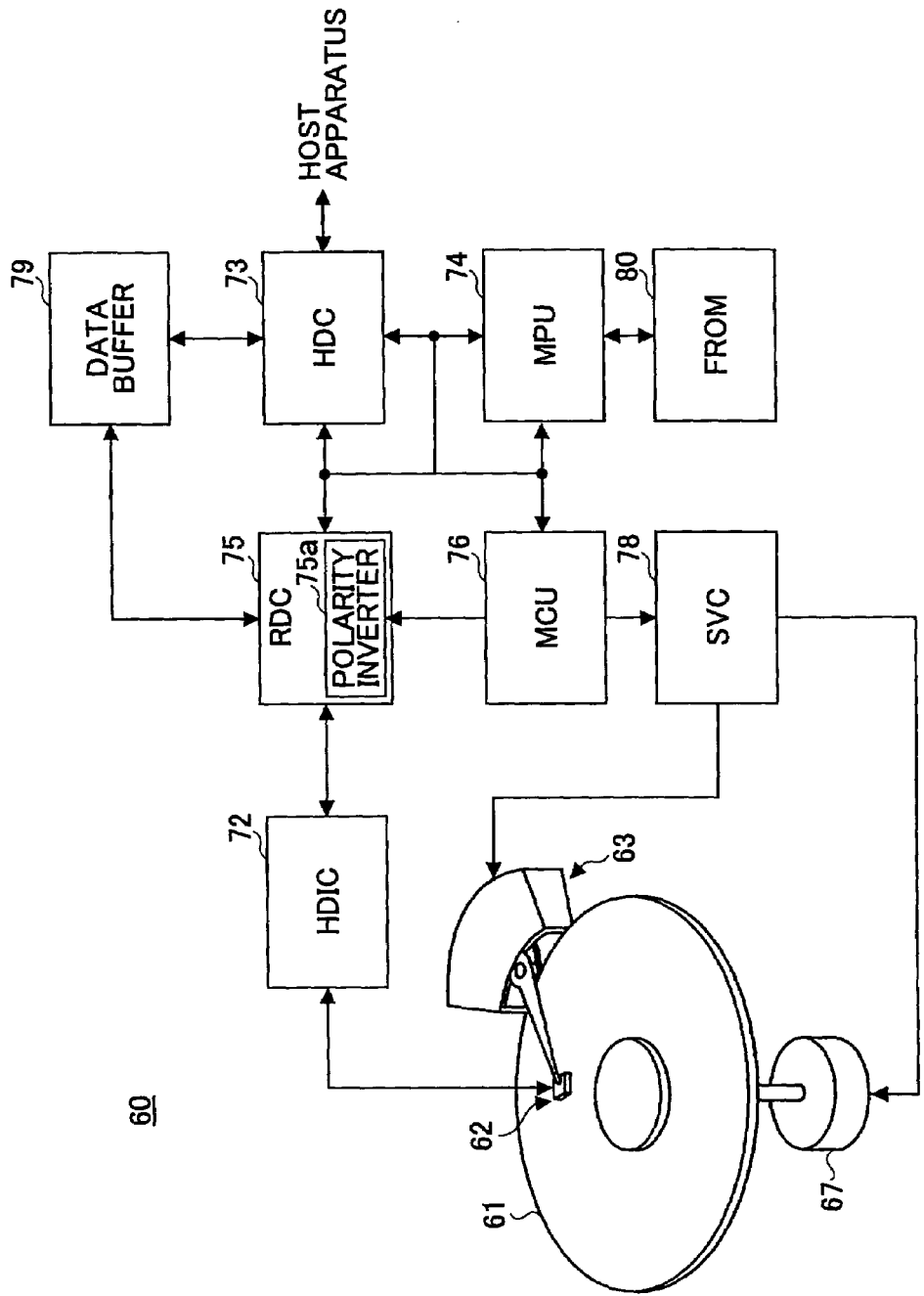
FIG. 11 is a block diagram of the magnetic storage device according to the second embodiment of the invention.

FIG. 11 is a block diagram illustrating the structure of the magnetic storage device. The circuit of the magnetic storage device 60 includes a hard disk controller (HDC) 73, a micro processing unit (MPU) 74, a read/write channel (RDC) 75, an HDIC 72, a motor control unit (MCU) 76, a servo controller (SVC) 78, a data buffer 79, and a flash ROM (FROM) 80.

The HDC 73 adds an error correction code (ECC) to the data item to be recorded received from the host apparatus, and supplies the data to the RDC 75. The HDC 73 determines positions of a sector and a track on the magnetic disk 61 for recording the data. Then, the HDC 73 controls, via the MCU 76, the position of the magnetic head 62 by means of the actuator 63. The position control of the magnetic head 62 is carried out by the servo controller provided in the HDC 73 and for controlling the SVC 78 and other components. In this process, the HDC 73 reads the servo signal and the sector ID from the magnetic disk 61 to use the demodulated and analog-to-digital converted reproduced data for the position control.

The RDC 75 modulates the data to be recorded supplied from the HDC 73. The HDIC 72 converts the modulated data signal into a recording current, and supplies the recording current to the recording element of the magnetic head 62 to write the data in the magnetic disk 61.

The SV element of the magnetic head 62 reads the data from the magnetic disk 61, and the readout signal is supplied, via the HDIC 72, to the RDC 75. The RDC 75 demodulates the readout signal to produce a reproduced data item, while performing error correction using the error correction code contained in the readout signal. If the error is not completely corrected through the error correction, read error occurs. If there is no error contained or error correction is successfully done, then the reproduced data item is transmitted to the host apparatus via the HDC 73.

The data buffer 79 temporarily stores data to be recorded and reproduction data. For example, the data buffer 79 stores queuing data items to be recorded in the magnetic disk 61, and reproduced data items before they are transmitted to the host apparatus. The data buffer 79 thereby stores data when performing so-called caching operations.

The MPU 74 controls the entirety of operations of the magnetic storage device 60. The MPU 74 performs initial setting for the HDC 73, RDC 75, and MCU 76, and manages the error map of the magnetic disk 61. In addition, the MPU 74 controls the recovery operation described below, which operation is performed when a read error has occurred. The MPU 74 performs these operations by executing the program written in memory, such as the FROM 80. Accordingly, detection of and recovery from the read error is controlled by the program.

Figure 12:
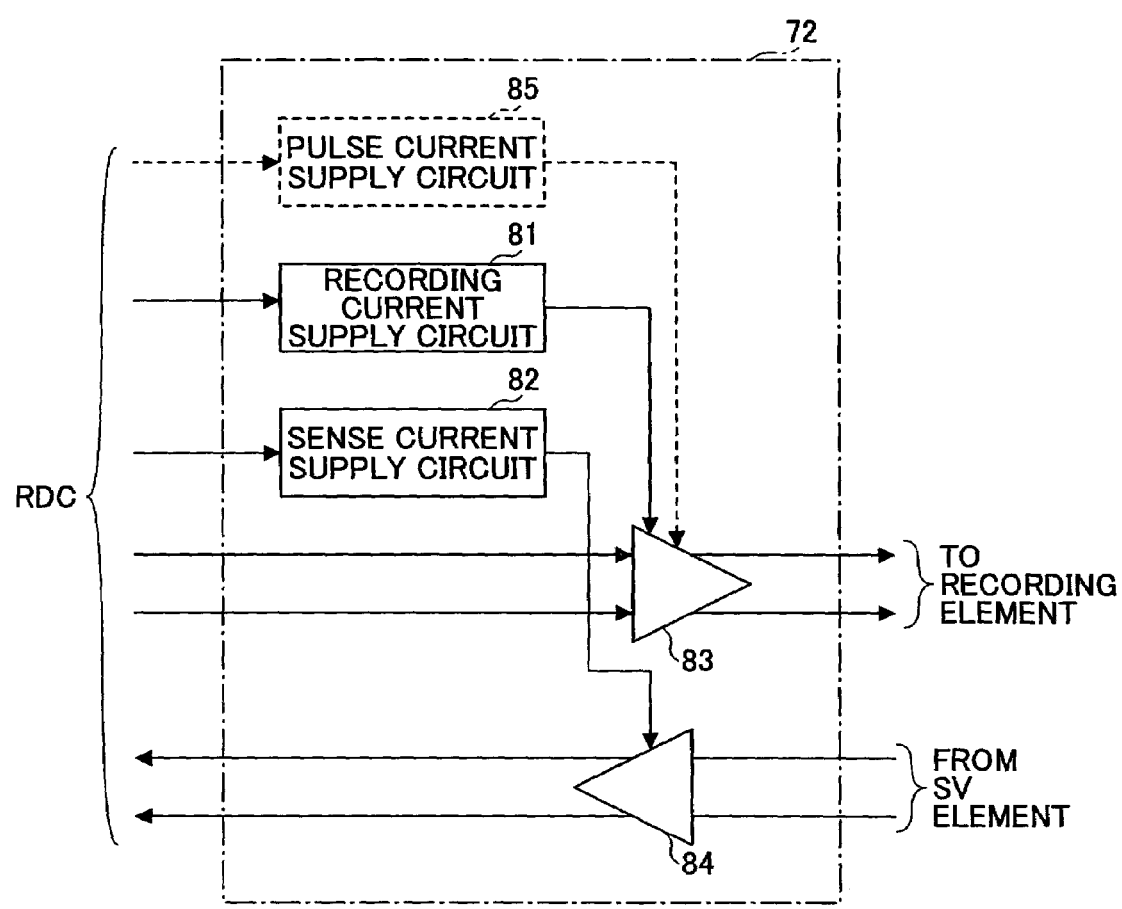
FIG. 12 is a schematic block diagram of an HDIC circuit structure.

FIG. 12 is a schematic block diagram of the HDIC circuit structure. The HDIC 72 includes a recording current supply circuit 81, a sense current supply circuit 82, a write amplifier (WA) 83, and a read amplifier (RA) 84. The HDIC 72 may further include a pulse current supply circuit 85.

The recording current supply circuit 81 receives a signal indicating a record current level from the RDC 75, and sets the recording current level in the write amplifier 83. The write amplifier 83 generates a recording current based on the modulated data to be recorded and a write timing signal supplied from the RDC 75. The recording current is supplied to the recording element to perform the writing operation.

The recording current supply circuit 81 also receives a signal indicating a current level of an alternating current level used for restoring the magnetization of the pinned layer 53

(referred to as a "pinned layer magnetization recovery process") from the RDC 75. The alternating current is the same as the ACT current used in the first embodiment, and therefore, referred to as an "ACT current" in the second embodiment also. The recording current supply circuit 81 sets the ACT current level in the write amplifier 83. The write amplifier 83 generates an ACT current based on the timing signal supplied from the RDC 75, and supplies the ACT current to the recording element.

The sense current supply circuit 82 receives a signal indicating a sense current level from the RDC 75, and sets the sense current level in the read amplifier 84. The read amplifier 84 supplies the sense current to the SV element 23. The SV element 23 detects the change in resistance caused by the magnetic field from the magnetic disk, and converts the resistance change into a voltage change, which is used as a reproduced signal. The read amplifier 84 amplifies the reproduced signal, and supplies it to the RDC 75.

The sense current supply circuit 82 also receives from the RDC 75 a signal indicating a current level of a direct current used for the pinned layer magnetization recovery process. The read amplifier 84 supplies the direct current (referred to as a "DCR current") to the SV element 23. The DCR current is supplied in the same direction as the sense current, and a magnetic field is produced in the SV element 23 in a prescribed direction of magnetization. In other words, the DCR current of the second embodiment flows in the opposite direction of the DCT current of the first embodiment.

Figure 13:
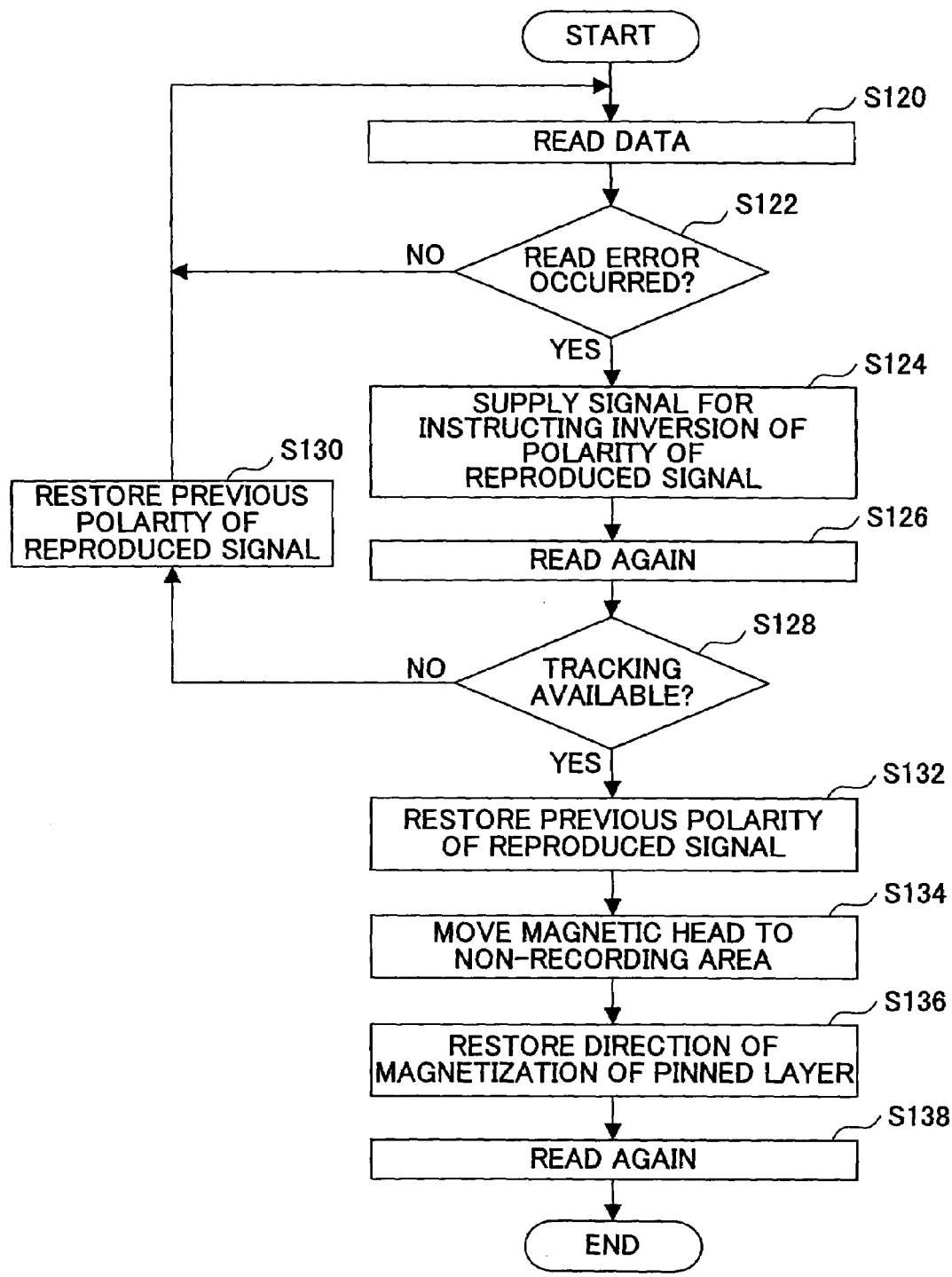
FIG. 13 is a flowchart of the operations for recovering from a read error.

Next, explanation is made of an error recovery technique performed when a read error has occurred according to the second embodiment, with reference to FIG. 13, as well as to FIG. 10 through FIG. 12.

FIG. 13 is a flowchart of the error recovery operations carried out when a read error has occurred.

First, the magnetic head 62 is moved to the position designated by the HDC 73 to read the data from the magnetic disk and produce a reproduced signal (S120). The reproduced signal is supplied to the RDC 75 via the read amplifier, then demodulated and error-corrected using the error correction code at the RDC 75. If the error is not corrected even after the error correction, a read error occurs (S122).

If a read error is detected, the MPU 74 loads a program for error recovery from the FROM 80, and supplies a polarity inverting signal to the RDC, instructing the RDC to invert the polarity of the reproduced signal before demodulation (S124). Upon receiving the polarity inverting signal, the RDC 75 inverts the polarity of the reproduced signal supplied from the HDIC 72, and demodulates the polarity-inverted reproduced signal. To perform this operation, a polarity inverter 75a is provided at the reproduced signal input end of the RDC 75, as illustrated in FIG. 11. The polarity inverter 75a inverts the polarity of the reproduced signal based on the polarity inverting signal. If an amplifier with an automatic gain controller (AGC) is installed at the reproduced signal input end of the RDC, the polarity inverter 75a is placed behind the AGC amplifier.

The MPU 74 instructs the HDC 73 to read data again (S126). The HDC 73 performs tracking on the track to be read with polarity inverter 75a of the RDC 75 set to the opposite polarity. During the tracking, the tracking servo signal read by the SV element is digitalized by the RDC 75, and the digital servo signal is used to carry out tracking control.

When the tracking cannot be performed by the RDC 75 with the opposite polarity (No in S128), the read error is not attributable to the inversion of the magnetization of the pinned layer 53, and therefore, the HDC 73 supplies a polarity restoration signal to the RDC 75. The RDC 75 switches the polarity inverter 75a so as to restore the previous polarity of the reproduced signal (S130).

When the RDC 75 can perform tracking normally with the opposite polarity (YES in S128), it means that the magnetization of the pinned layer 53 of the SV element has been inverted. In this case, the HDC 73 supplies a polarity restoration signal to the RDC 75 to restore the previous polarity of the reproduced signal (S132). Then, the HDC 73 transmits a seek signal via the MCU 76 to the SVC 78 to move the magnetic head 62 to the non-recording area, for example, to the inner guard band located inside the recording area (S134).

Then, magnetization of the pinned layer 53 is restored (S136). The pinned layer magnetization recovery process is performed in a manner similar to the pinned layer magnetization inverting process of the first embodiment, except that the direction of the magnetic field applied to the pinned layer 53 is opposite to that of the first embodiment. To be more precise, under the occurrence of the read error, the magnetization of the pinned layer 53 is in the inverted state, and therefore, the magnetization $M_{PIN}$ of the pinned layer 53 points in the Y1 direction in FIG. 5, which direction is opposite to the depicted magnetization $M_{PIN}$. So, a DCR current is supplied from terminal 48B to terminal 48a (in the X2 direction) so that the magnetic field induced by the DCR current points in the Y2 direction in the pinned layer 53. An ACT current is supplied in a manner similar to the first embodiment under the supply of the DCR current. As a result, a current with a waveform shown in FIG. 7C flows in the SV film 50, which current inverts the direction of $M_{PIN}$ to the Y2 direction. The levels of the DCR current and the ACT current are appropriately selected so that the magnetization of the pinned layer is inverted when the both currents are simultaneously supplied. Preferably, the DCR current level is selected in the range from the same level double the level of the sense current of the reading operation. It is preferable for the ACT current to be set in the range from 30 mA to 60 mA.

To set the ACT current level and the DCR current level, signals are supplied from the MPU 74 via the HDC 73 and the RDC 75 to the recording current circuit and the sense current circuit, respectively, formed in the HDIC 72.

Then, the MPU 74 supplies a re-reading instruction to the HDC 73, and the magnetic head seeks the original track by means of the SVC 78 to perform the read operation again (S138). Since the magnetization of the pinned layer 53 is restored to the normal orientation, on-track operation is performed normally, and data are read from the magnetic disk.

In S136, an ACPT current explained in the first embodiment may be used in place of the ACT current. In this case, a pulse current supply circuit 85 is further provided in the HDIC 72, as illustrated by the dashed block in FIG. 12 to produce a pulse illustrated in FIG. 9C, which pulse is superposed on the ACT current at the write amplifier 83.

With the second embodiment, if a read error has occurred due to inversion of the magnetization of the pinned layer 53 of the SV element 23 of the magnetic head 62, the direction of the magnetization can be restored to the normal position without damaging the SV element 23, and at the same time, the read error can be corrected. Consequently, a highly reliable magnetic storage device can be realized.

A read error may increase when the magnetization of the pinned layer 53 deviates from a prescribed direction although it is not completely inverted. In this case, steps S124 through S128 and S132 shown in FIG. 13 are omitted, and the driving of the magnetic head to the non-recording area (S134) and the pinned layer magnetization recovery operation (S136) are performed. The magnetization of the pinned layer 53 is restored to the prescribed direction, and the symmetry in the positive and negative amplitudes of the reproduced signal is improved. Consequently, occurrence of read errors can be reduced. This magnetization recovery operation may be performed when a read error rate or an error correction rate exceeds a prescribed level by having the MPU 74 monitor the read error rate or the error correction rate of the error correcting code. Furnishing the error recovery function will lead to a further reliable magnetic storage device.

Although the present invention has been described based on the preferred embodiments, the invention is not limited to these specific examples. Many substitutions and modifications can be made by people with an ordinary skill in the art, without departing from the scope of the invention, which is defined by the appended claims.

For instance, the SV element shown 23 shown in FIG. 5 is used in the first and second embodiments; however, the invention may be applied to an SV element which is upside-down including the terminals.

Similarly, the present invention is applicable to a pinned layer with a so-called multilayered ferri-structure. In the multilayered ferri-structure, a first fixed magnetized layer, a nonmagnetic coupling layer, and a second magnetized layer are deposited over an antiferromagnetic layer, where the first and second fixed magnetic layers are exchange-coupled antiferromagnetically. In this case, when inverting the magnetization of the first fixed magnetic layer under the application of the inverted magnetic field generated by the magnetization inverting current, the magnetization of the second fixed magnetic layer is inverted by the antiferromagnetic exchange-coupling with the first fixed magnetic layer.

The present invention is also applicable to an SV element having multiple ferromagnetic layers in which the free layer and the pinned layer are ferromagnetically coupled.

This patent application is based on and claims the benefit of the earlier filing date of Japanese Patent Application No. 2005-105230 filed Mar. 31, 2005, the entire contents of which are incorporated herein by reference.

What is claimed is:

1. A magnetic storage apparatus comprising:
a magnetic recording medium;
a magnetic head having a recording element and a magnetoresistive spin-valve element;
a recording/reproduction controller configured to record and reproduce information in and from the magnetic recording medium using the magnetic head;
a determination unit configured to determine a direction of the magnetization of a pinned layer of the spin-valve element when a reproduction error has occurred, the pinned layer being adjacent to an antiferromagnetic layer; and
a magnetization recovery unit configured to supply a first alternating current to the recording element, while supplying a third current for generating a magnetic field in a prescribed direction of the magnetization of the pinned layer to the spin-valve element, to restore the direction of the magnetization of the pinned layer to the prescribed direction when the magnetization of the pinned layer is inverted with respect to the prescribed direction.

2. The magnetic storage device of claim 1, wherein the determination unit is further configured to invert a polarity of a track servo signal reproduced from the magnetic recording medium, and to determine whether the magnetic head can track according to the polarity-inverted track servo signal.

3. The magnetic storage device of claim 1, wherein the magnetization recovery unit is configured to restore the magnetization of the pinned layer in a non-recording area of the magnetic recording medium.

4. A method for evaluating a magnetized state of a pinned layer of a magnetoresistive spin-valve element used, together with a recording element, in a magnetic head, the method comprising the steps of:
supplying a first alternating current to the recording element, while supplying a second current for generating a magnetic field to the spin-valve element, the direction of the magnetic field generated by the second current being opposite to a prescribed direction of the magnetization of the pinned layer adjacent to an antiferromagnetic layer; and
determining whether the magnetization of the pinned layer is inverted toward said direction opposite to the prescribed direction.

5. The method of claim 4, further comprising the steps of:
increasing either the first or second current level to determine whether the inversion of the magnetization of the pinned layer has occurred; and
acquiring the current level of the first or second current at which the inversion of magnetization has occurred.

6. The method of claim 4, wherein the determination as to the occurrence of inversion of the magnetization of the pinned layer is performed by reproducing information recorded on a magnetic recording medium and based on a polarity of the reproduced signal.

7. The method of claim 4, wherein the first current has a rectangular waveform, and the absolute values of the positive maximum value and the negative maximum value are substantially equal to each other.

8. The method of claim 7, further comprising the steps of:
superposing a short width pulse on the first alternating current at a rising edge of the first alternating current, the pulse width being shorter than a half period of the first alternating current; and
increasing the pulse width to increase the current level of the first alternating current.

9. A method for manufacturing a magnetic head having a recording element and a magnetoresistive spin-valve element, comprising the step of testing a magnetized state of a pinned layer of the spin-valve element, wherein the testing step includes:
supplying a first alternating current to the recording element, while supplying a second current for generating a magnetic field to the spin-valve element, the direction of the magnetic field generated by the second current being opposite to a prescribed direction of the magnetization of the pinned layer adjacent to an antiferromagnetic layer; and
determining whether the magnetization of the pinned layer is inverted toward said direction opposite to the prescribed direction.

10. A method for manufacturing a magnetic head having a recording element and a magnetoresistive spin-valve element, comprising at least the step of:
testing a magnetized state of a pinned layer of the spin-valve element;
wherein a first alternating current is supplied to the recording element, while supplying a second current for generating a magnetic field opposite to a prescribed direction of the magnetization of the pinned layer of the pin-valve element;

the current level of the first current or the second current is successively increased to determine whether the magnetization of the pinned layer has been inverted to the opposite direction; and the current level of the first or second current at which the inversion of the magnetization has occurred is acquired.

11. An apparatus for evaluating a magnetized state of a pinned layer of a magnetoresistive spin-valve element used, together with a recording element, in a magnetic head, comprising:

a magnetic recording medium;

a holder configured to hold the magnetic head and move the magnetic head relative to the recording medium;

a controller configured to control a recording and reproduction operation of the magnetic head so as to supply a first alternating current to the recording head, while supplying a second current for generating a magnetic field opposite to a prescribed direction of the magnetization of the pinned layer adjacent to an antiferromagnetic layer of the spin-valve element, to control the inversion of the magnetization of the pinned layer; and a determination unit configured to detect a polarity of a reproduced signal obtained by the spin-valve element through reproduction of information from the magnetic recording medium and determine occurrence of the inversion of the magnetization of the pinned layer based on the detected polarity of the reproduced signal.

* * * * *